United States Patent
Li et al.

(10) Patent No.: US 8,496,337 B2
(45) Date of Patent: Jul. 30, 2013

(54) COVER AND ELECTRONIC APPARATUS

(75) Inventors: Hsin-Hung Li, Gueishan Township, Taoyuan County (TW); Chun-Ming Shen, Gueishan Township, Taoyuan County (TW); Tsung-Hsun Wu, Gueishan Township, Taoyuan County (TW)

(73) Assignee: Qisda Corporation, Taoyuan (TW)

( * ) Notice: Subject to any disclaimer, the term of this patent is extended or adjusted under 35 U.S.C. 154(b) by 274 days.

(21) Appl. No.: 12/840,962

(22) Filed: Jul. 21, 2010

(65) Prior Publication Data
US 2011/0019165 A1    Jan. 27, 2011

(30) Foreign Application Priority Data
Jul. 21, 2009   (TW) .............................. 98124552 A

(51) Int. Cl.
*G03B 21/14*    (2006.01)
*G03B 21/22*    (2006.01)

(52) U.S. Cl.
USPC .......... 353/119; 353/122; D26/119; 362/185; 362/186

(58) Field of Classification Search
USPC ................. 353/119, 122; D26/119; 362/185, 362/186, 311.14
See application file for complete search history.

(56) References Cited

U.S. PATENT DOCUMENTS

| 6,345,896 B1 * | 2/2002 | Kurosawa ..................... 353/119 |
| 2004/0239897 A1 * | 12/2004 | Ogawa et al. ................. 353/119 |
| 2008/0186457 A1 * | 8/2008 | Takada et al. .................. 353/98 |
| 2009/0103059 A1 | 4/2009 | Chou |

FOREIGN PATENT DOCUMENTS

| CN | 101414109 A | 4/2009 |
| TW | M272992 | 8/2005 |
| TW | 200921251 | 5/2009 |
| TW | 200921251 A * | 5/2009 |

OTHER PUBLICATIONS

English translation of abstract of CN 101414109 A.
"Scientific Life: Broken Fluorescent Lamps Should be Disinfected"; www.gov.cn; Jul. 9, 2008.
China Office Action dated Jan. 19, 2011.
Taiwan Office Action dated Aug. 9, 2012.
English translation of abstract of TW 200921251.
English translation of abstract of TW M272992.

* cited by examiner

*Primary Examiner* — Georgia Y Epps
*Assistant Examiner* — Magda Cruz

(57) ABSTRACT

The invention discloses a cover and an electronic apparatus with the cover. The cover is used for covering an opening of a casing of the electronic apparatus. The cover of the invention includes a covering body and a catching structure. Therein the covering body has an inner surface. When the opening is covered with the cover, the inner surface is toward the interior of the casing. The catching structure is formed on the inner surface for catching an object falling on the inner surface. The catching structure could be an adhesive layer or include a protrusive structure. If the catching structure is an adhesive layer, the object falling on the inner surface adheres to the adhesive layer. If the catching structure includes the protrusive structure, the object is confined by the protrusive structure.

32 Claims, 4 Drawing Sheets

COVER AND ELECTRONIC APPARATUS

BACKGROUND OF THE INVENTION

1. Field of the Invention

The present invention relates to a cover and an electronic apparatus, and more particularly, to a cover having a catching structure and an electronic apparatus comprising the same.

2. Description of the Prior Art

Projector is generally used in conference to project a briefing material or a meeting material on a curtain. The main structure of the projector includes a bulb (for example, high-pressure mercury light bulb or light-emitting diode), a lens, a spectroscope, a panel and a casing for protecting said elements. Additionally, an opening is formed on the casing to be a channel of the inside and the outside of the projector, so as to facilitate a user to replace the bulb or other components of the projector. In order to prevent dust entering into the casing and to avoid the bulb or the components to leave from the casing, a cover is used for covering the opening. When the bulb of the projector is failure or broken, a user can open the cover to replace it.

Take the hanging-type projector as an example. The hanging-type projector is disposed at the ceiling (or hung down from the ceiling), and the cover is usually designed on the surface of the casing toward the ground for facilitating the user to replace the bulb or other components. However, if the bulb of the projector is broken because of vibration or misuse, the glass fragments of the bulb will scatter in the projector. At this time, when the cover is opened, the glass fragments may drop into the user's eyes and cause visional damage.

SUMMARY OF THE INVENTION

Accordingly, an aspect of the invention is to provide a cover for solving the problem of the prior art.

The invention discloses a cover for covering an opening of a casing. The cover of the invention includes a covering body and a catching structure. The covering body has an inner surface. When the opening is covered with the cover, the inner surface of the covering body is toward the interior of the casing. The catching structure is formed on the inner surface for catching an object falling on the inner surface. In practice, the catching structure of the invention can be an adhesive layer or can include a protrusive structure. When the catching structure is an adhesive layer, it can stick the object falling on the inner surface. When the catching structure includes a protrusive structure, the protrusive structure can be a plurality of protrusive columns or a retaining wall which surround a region on the inner surface. When the object falls in the region, the object is trapped by the catching structure.

Another aspect of the invention is to provide an electronic apparatus including the cover as mentioned above, so as to solve the problem of the prior art.

The electronic apparatus of the invention includes a casing, a light source and a cover. The casing has an opening, and the light source is disposed in the casing and toward the opening. The cover is used for covering the opening and includes a covering body and a catching structure. The covering body has an inner surface. When the opening is covered with the cover, the inner surface is toward the interior of the casing. The catching structure is formed on the inner surface. In practice, the catching structure can be an adhesive layer or can include a protrusive structure. When the object falls from the interior of the casing to the inner surface, the object will be caught by the catching structure.

To sum up, the catching structure of the cover and the electronic apparatus of the invention can stick or trap the object falls to the inner surface. In the prior art, when a user replaces a component, he or she easily gets hurt because of the object falling from the electronic apparatus. The catching structure of the invention can prevent such accident.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

DETAILED DESCRIPTION OF THE INVENTION

The invention provides a cover and an electronic apparatus using the same.

Figure 1A:
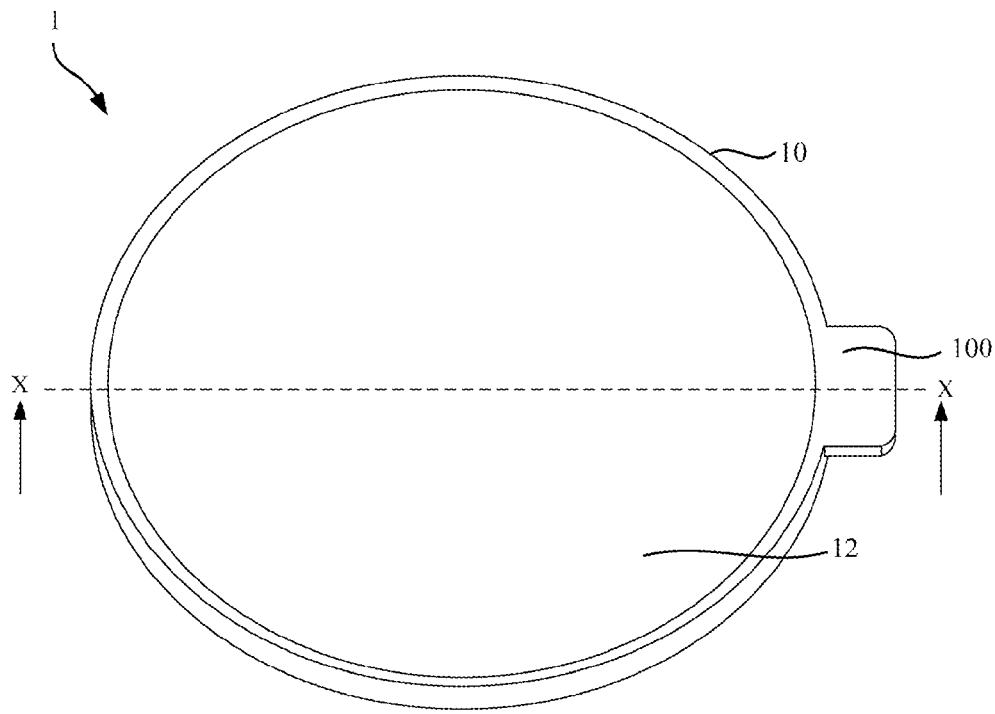
FIG. 1A illustrates a cover according to an embodiment of the invention.
Figure 1B:
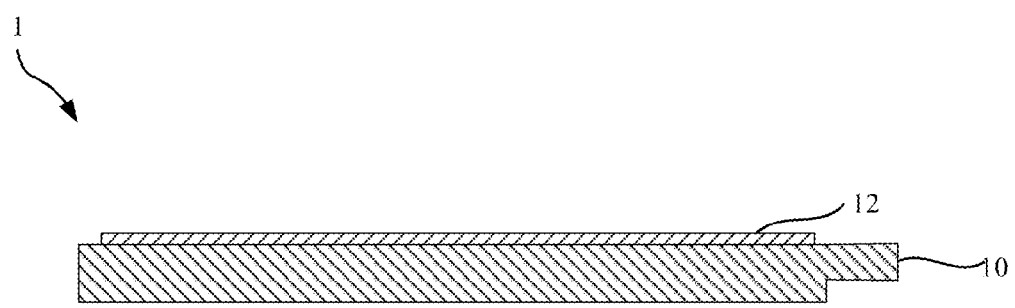
FIG. 1B is a cross-section diagram of FIG. 1A along line X-X.

Please refer to FIG. 1A and FIG. 1B. FIG. 1A illustrates a cover according to an embodiment of the invention, and FIG. 1B is a cross-section diagram of FIG. 1A along line X-X. As shown in FIG. 1A and FIG. 1B, the cover 1 of the invention includes a covering body 10 and a catching structure 12. The covering body 10 has an inner surface 100. The catching structure 12 is formed on the inner surface 100 of the covering body 10. In practice, the cover 1 can cover an opening of a casing (not shown), for example, an opening of a casing of a hanging-type projector, an opening for a battery of a cell phone, or an opening for a light bulb of a flashlight. When the opening of the casing is covered with the cover 1, the inner surface 100 of the covering body 10 is toward the interior of the casing.

The catching structure 12 is used for catching an object (not shown) falling on the inner surface 100, such as glass detritus, metal fragment and so on. The term "catching" in the invention refers to keep the falling object on the inner surface 100 of the covering body 10 by the catching structure 12. In order to catch the object falling on the inner surface 100 of the covering body 10, an adhesive material is used to manufacture the catching structure 12 of the embodiment. As shown in FIG. 1A, the catching structure 12 is a first adhesive layer formed on the inner surface 100 for sticking the object, so that the object is stayed in the inner surface 100. The first adhesive layer of the catching structure 12 is a twin adhesive tape, wherein one surface of the tape is adhered on the inner surface 100, and the other surface is used for sticking the object. The first adhesive layer also can be formed by painting viscose on the inner surface 100. As mentioned in the prior art, if a light bulb is broken when a user replaces it, the fragments of the broken light bulb easily drop into the user's eyes and cause visional damage. Therefore, the first adhesive layer (the catching structure 12) is designed for sticking said object falling on the inner surface 100 to prevent such accidents. Additionally, the shape of the cover 1 is not limited to that in FIG. 1A, but depends on the actual demand.

Figure 2:
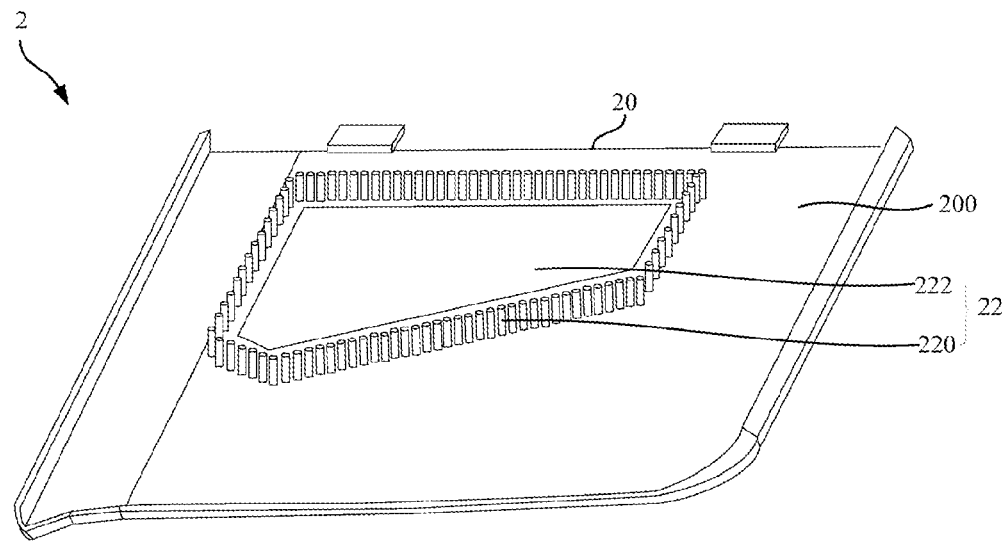
FIG. 2 illustrates a cover according to another embodiment of the invention.

Please note that, the catching structure 12 is not limited to the first adhesive layer. In practice, the catching structure 12 of the invention can further include a protrusive structure like a protrusive column or a retaining wall. Please refer to FIG. 2. FIG. 2 illustrates a cover 2 according to another embodiment of the invention. As shown in FIG. 2, the cover 2 of the invention includes a covering body 20 and a catching structure 22. The covering body 20 has an inner surface 200. The catching structure 22 includes a plurality of protrusive columns 220 (only one of them is marked). The plurality of protrusive columns 220 are stood on the inner surface 200 and are connected to the inner surface 200. As mentioned above, the catching structure 22 is used for catching an object falling on the inner surface 200. In order to achieve this objective, the plurality of protrusive columns 220 are disposed to surround a predetermined region on the inner surface 200, wherein the region corresponds to the position where the object may fall to. When the object falls on the region, it will be stopped by the protrusive columns 220 and be trapped within the region, so as to prevent the user's body or eyes from being hurt by the falling object.

Additionally, in order to enhance the catching effect, besides the plurality of protrusive columns 220, the catching structure 22 can further includes a second adhesive layer 222 which is formed on the region surrounded by the protrusive columns 220, so as to stick the object falling on the inner surface 200. The manufacturing method of the second adhesive layer 222 is similar to that of the first adhesive layer and the second adhesive layer 222 can also be manufactured by an adhesive material. As mentioned above, the second adhesive layer can be a twin adhesive tape, wherein one surface of the tape is adhered on the surrounded region. The second adhesive layer may also be formed by painting viscose on the inner surface 200. Additionally, because the objects falling on the inner surface 200 may have different sizes, the second adhesive layer 222 can be used to stick smaller object (such as detritus), whereas the plurality of protrusive columns 220 can be used to trap the bigger object (such as fragments) in the surrounded region. In the embodiment, a pentagon region is surrounded by the plurality of protrusive columns. However, in practice, the size and the shape of the surrounded region depends on the possible position of the falling object, and is not limited to the embodiment. The shape and the height of the plurality of protrusive columns are also not limited to the embodiment. Different protrusive columns 220 may have different shapes and different heights. Practically, it's helpful for catching the falling object by forming a plurality of protrusive columns in the region surrounded by said protrusive columns 220. It's also helpful for catching the falling object by forming concave patterns or convex patterns (for example, embossed patterns or notched patterns) on the protrusive columns 220.

Compared the cover of FIG. 2 with the cover 1 of FIG. 1, it is clear that the catching structure 12 of FIG. 1 is an adhesive layer, while the catching structure 22 of FIG. 2 includes a plurality of protrusive columns 220. The advantage of the adhesive layer is that the structure is simple and the protrusive structure on the inner surface 100 is not necessary, so as to reduce the manufacturing procedure. On the other hand, the advantage of the plurality of protrusive columns 220 is that the gaps between the protrusive columns 220 make the user easily cleans the object falling on the inner surface 200 (i.e., the object could be swept out through the gap).

Figure 3A:
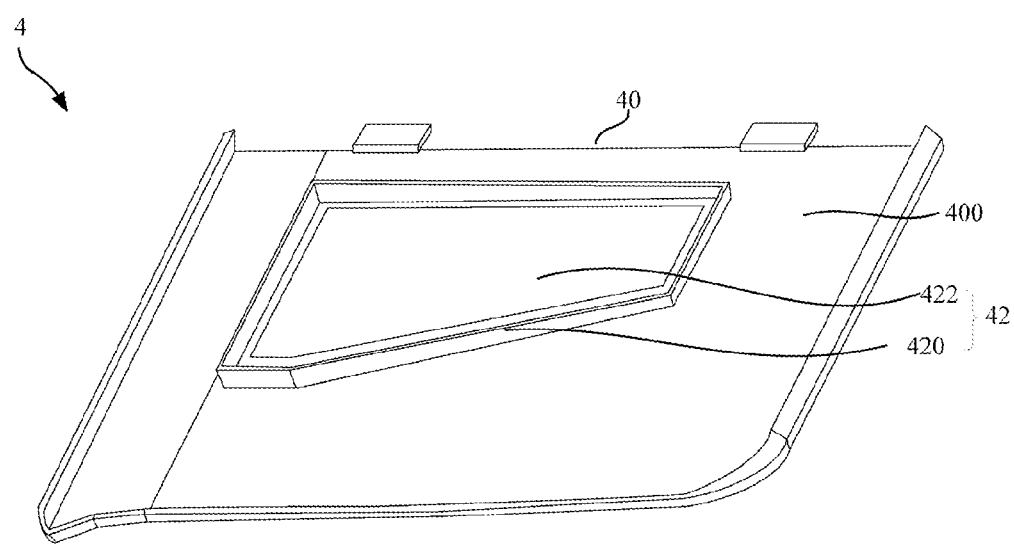
FIG. 3A illustrates a cover according to another embodiment of the invention.

The protrusive structure contained in the catching structure not only could be a plurality of protrusive columns, but also could be a retaining wall. Please refer to FIG. 3A. FIG. 3A illustrates a cover 4 according to another embodiment of the invention. As shown in FIG. 3A, the cover 4 of this invention comprises a covering body 40 and a catching structure 42. The covering body 40 has an inner surface 400. The catching structure 42 includes a retaining wall 420. The retaining wall 420 is formed on the inner surface 400, and is connected to the inner surface 400. Similar to the protrusive columns 220 of the catching structure 22 shown in FIG. 2, the catching structure 42 of the embodiment includes a retaining wall 420 for catching the object falling on the inner surface 400. Similarly, a predetermined region is surrounded by the retaining wall 420 surrounds a predetermined region, and the surrounded region is a closed region. However, in practice, the region may not be a closed region, that is, there may be an opening on the retaining wall 420 for help the user to clean the object falling on the region. When an object falls in the region surrounded by the retaining wall 420, the object is trapped within the surrounded region. Similarly, besides the retaining wall 420, the catching structure 42 further includes a second adhesive layer 422 for sticking the object falling on the inner surface 400. The function of the second adhesive layer 422 is as mentioned above and discussion of unnecessary details will be hereby omitted.

Compared the cover 4 of FIG. 3A with the cover 2 of FIG. 2, it is clear that the protrusive structure of the catching structure 22 includes a plurality of protrusive columns 220, and the protrusive structure of the catching structure 42 includes a retaining wall 420. The advantage of the protrusive columns is that both the object falling on the region and the second adhesive layer are easily eliminated through the protrusive columns. For example, when the second adhesive layer 222 fully adhered with detritus, the user can let a solvent flows through the gaps of the protrusive columns 220 into the region to eliminate the second adhesive layer 222 and then let the solvent flows out the region through the gaps. On the other hand, the advantage of the retaining wall 420 is that the closed region surrounded by the retaining wall 420 is capable of trapping small objects even there is no second adhesive layer 422 formed on the region.

Figure 3B:
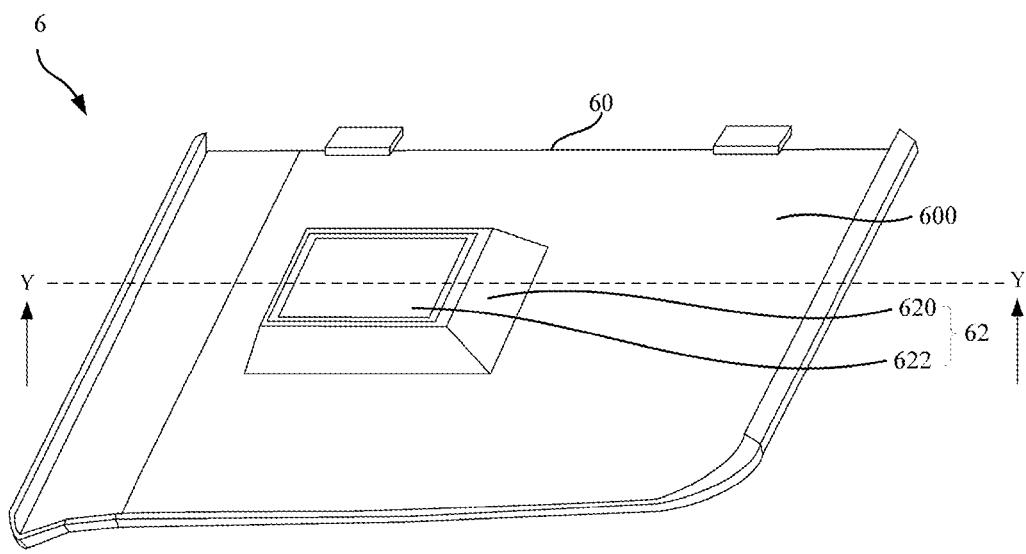
FIG. 3B illustrates a cover according to another embodiment of the invention.
Figure 3C:
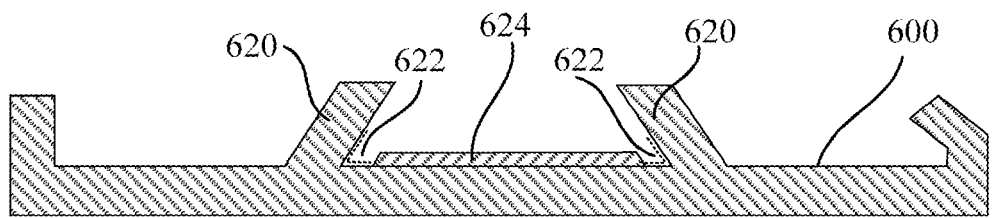
FIG. 3C is a cross-section diagram of FIG. 3B along line Y-Y.

The retaining wall 420 of FIG. 3A is not necessary to be perpendicular to the inner surface 400 of the covering body 40. In practice, the included angle of the retaining wall 420 and the inner surface 400 is smaller than 90 degrees, so as to form a trench. Please refer to FIG. 3B and FIG. 3C. FIG. 3B illustrates a cover 6 according to another embodiment of the invention, and FIG. 3C is a cross-section diagram of FIG. 3B along line Y-Y. As shown in FIG. 3B and FIG. 3C, the cover 6 of the invention includes a covering body 60 and a catching structure 62. The covering body 60 has an inner surface 600. The catching structure 62 includes a retaining wall 620 which is formed on the inner surface 600 and is connected to the inner surface 600. Similar to the catching structure 42 of FIG. 3A, the catching structure 62 not only includes the retaining wall 620, but also comprises a second adhesive layer 622 formed on the inner surface 600 for sticking the object falling on the inner surface 600.

The difference of the catching structure 62 of FIG. 3B and the catching structure 62 of FIG. 3A is that the retaining wall 620 and the inner surface 600 of the catching structure 62 of FIG. 3B form an included angle smaller than 90 degrees, so as to form a trench 624 (the region of dashed line represented in FIG. 3C approximately). When an object falls into the region, the object may be hooked by the trench 624 and not easy to drop out from the retaining wall 620 even the cover 6 is shaken. Of course, the shape of the trench 624 is not limited to the embodiment.

Figure 4:
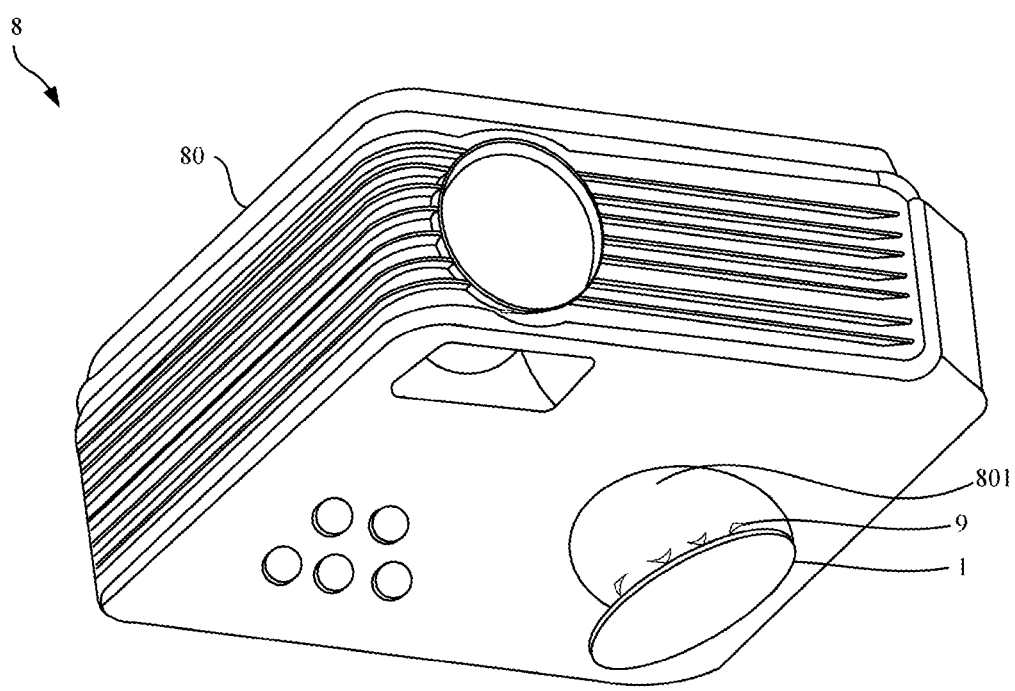
FIG. 4 illustrates an electronic apparatus according to another embodiment of the invention.

In practice, the cover of the invention is applied to an electronic apparatus for covering an opening of a casing of the electronic apparatus. The electronic apparatus can be a hanging-type projector, a flashlight or other suitable apparatus. Please refer to FIG. 4. FIG. 4 illustrates an electronic apparatus 8 according to another embodiment of the invention. Please also refer to FIG. 1A for comparison. As shown in FIG. 4, the electronic apparatus 8 is an hanging-type projector, which includes a casing 80, a cover 1 and a light source (not shown, in principle, the light source is located in the interior of the casing 80 and on the upper side of the cover 1), wherein the cover 1 is the cover 1 of FIG. 1A. The casing 80 has an opening 801, and the cover 1 is used for covering the opening 801. The light source is disposed in the casing 80 and toward the opening 801. The cover 1 further includes a covering body 10 and a catching structure 12. The covering body 10 has an inner surface 100. The catching structure 12 is formed on the inner surface 100. When the opening 801 is covered with the cover 1, the inner surface 100 of the covering body 10 is toward the interior of the casing 80, so that the catching structure 12 formed on the inner surface 100 is also toward the interior of the casing 80. The catching structure 12 can be a first adhesive layer for sticking objects 9 falling on the inner surface 100. In this embodiment, the object 9 is glass or metal detritus.

Additionally, the cover 1 also has the same structure as the cover 2 and 4 showed in FIGS. 2 to 3B, which includes the protrusive columns 220 or the retaining wall 420 which surrounds a region on the inner surface 200 and 400 for catching the objects 9 falling on the inner surface 200 and 400. Please refer to aforementioned specification for detailed function and structure description. In practice, the cover 1 can be screwed on the casing 80. Moreover, we can form a tenon on the casing 80 near the opening 801 and form a mortise on the cover 1, so as to wedge the cover 1 on the opening 801.

In practice, the electronic apparatus 8 is a hanging-type projection apparatus, while the light source is the light source for projecting. When the electronic apparatus 8 is hung on the ceiling and the inner surface 100 is disposed toward the ceiling, the catching structure 12 formed on the inner surface 100 is toward the interior of the casing 80. When the objects 9 (for example, the glass fragments of the light source) drops toward the direction of the cover 1 by gravity, the objects 9 can be caught by the catching structure 12 as long as the position of the catching structure 12 corresponds to the descent point of the object 9. As mentioned above, the catching structure 12 can prevent the above-mentioned accident happened when a user opens the cover.

To sum up, the cover and the electronic apparatus of the invention includes a catching structure. The catching structure can be an adhesive layer or it can include a protrusive structure, such as a plurality of protrusive columns or a retaining wall. When the catching structure is an adhesive layer, it can stick the object falling on the surface of the cover. On the other hand, when the catching structure includes a plurality of protrusive columns or a retaining wall, it can trap the object, so as to prevent the object falling out from the cover. In the prior art, it is possible for the object falling out from the opening of the electronic apparatus to hurt a user when the user replaces the components of the electronic apparatus. Especially if the object is glass detritus or metal detritus, it may cause permanent damage of the user's eyes. Accordingly, the catching structure of the invention can be used to solve the problem. The catching structure is disposed toward the opening, and when the object falls on the opening region, the catching structure can stick or trap the object, so as to prevent the accident.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A cover for covering an opening of a casing, the cover comprising:
    a covering body having an inner surface, when the opening is covered with the cover, the inner surface is toward the interior of the casing and the cover becomes a part of an outer surface of the casing; and
    a catching structure formed on the inner surface, for catching an object falling on the inner surface, wherein the catching structure comprises a protrusive structure formed on the inner surface.

2. The cover of claim 1, wherein the catching structure further comprises a first adhesive layer for adhering the object.

3. The cover of claim 2, wherein the first adhesive layer is a twin adhesive tape.

4. The cover of claim 1, wherein the protrusive structure comprises a plurality of protrusive columns.

5. The cover of claim 4, wherein a region of the inner surface is surrounded by the plurality of protrusive columns.

6. The cover of claim 5, wherein the catching structure comprises a second adhesive layer formed on the region for adhering the object.

7. The cover of claim 1, wherein the protrusive structure comprises a retaining wall.

8. The cover of claim 7, wherein a region of the inner surface is surrounded by the retaining wall.

9. The cover of claim 8, wherein the region is a closed region.

10. The cover of claim 8, wherein the catching structure comprises a second adhesive layer formed on the region for adhering the object.

11. An electronic apparatus, comprising:
    a casing having an opening;
    a light source disposed in the casing; and
    a cover for covering the opening, the cover comprising:
        a covering body having an inner surface, when the opening is covered with the cover, the inner surface is toward the interior of the casing and the cover becomes a part of an outer surface of the casing; and
        a catching structure formed on the inner surface, for catching an object falling on the inner surface to keep the object stay on the inner surface;
    wherein the catching structure comprises a protrusive structure formed on the inner surface, the opening of the casing facilitates a user to replace the light source, and the object falling on the inner surface is a part of the light source.

12. The electronic apparatus of claim 11, wherein the catching structure further comprises a first adhesive layer for adhering the object.

13. The electronic apparatus of claim 12, wherein the first adhesive layer is a twin adhesive tape.

14. The electronic apparatus of claim 11, wherein the protrusive structure comprises a plurality of protrusive columns.

15. The electronic apparatus of claim 14, wherein a region of the inner surface is surrounded by the plurality of protrusive columns.

16. The electronic apparatus of claim 15, wherein the catching structure comprises a second adhesive layer formed on the region for adhering the object.

17. The electronic apparatus of claim 11, wherein the protrusive structure comprises a retaining wall.

18. The electronic apparatus of claim 17, wherein a region of the inner surface is surrounded by the retaining wall.

19. The electronic apparatus of claim 18, wherein the region is a closed region.

20. The electronic apparatus of claim 18, wherein the catching structure comprises a second adhesive layer formed on the region for adhering the object.

21. The electronic apparatus of claim 11, wherein the light source is disposed toward the opening.

22. The electronic apparatus of claim 11, wherein the light source is a projection light source.

23. An electronic apparatus, comprising:
   a casing having an opening;
   a light source disposed in the casing; and
   a cover for covering the opening, the cover comprising:
   a covering body having an inner surface, when the opening is covered with the cover, the inner surface is toward the interior of the casing and the cover becomes a part of an outer surface of the casing; and
   a catching structure formed on the inner surface, for catching an object falling on the inner surface;
   wherein the catching structure comprises a protrusive structure formed on the inner surface.

24. The electronic apparatus of claim 23, wherein the protrusive structure comprises a plurality of protrusive columns.

25. The electronic apparatus of claim 24, wherein a region of the inner surface is surrounded by the plurality of protrusive columns.

26. The electronic apparatus of claim 25, wherein the catching structure comprises a second adhesive layer formed on the region for adhering the object.

27. The electronic apparatus of claim 23, wherein the protrusive structure comprises a retaining wall.

28. The electronic apparatus of claim 27, wherein a region of the inner surface is surrounded by the retaining wall.

29. The electronic apparatus of claim 28, wherein the region is a closed region.

30. The electronic apparatus of claim 28, wherein the catching structure comprises a second adhesive layer formed on the region for adhering the object.

31. The electronic apparatus of claim 23, wherein the light source is disposed toward the opening.

32. The electronic apparatus of claim 23, wherein the light source is a projection light source.

* * * * *